United States Patent [19]

Henn et al.

[11] Patent Number: 5,525,637
[45] Date of Patent: Jun. 11, 1996

[54] EXPANDABLE STYRENE POLYMERS

[75] Inventors: Rolf Henn, Ketsch; Klaus Hahn, Kirchheim; Andreas Deckers, Flomborn; Wolfgang Loth, Bad Dürkheim; Uwe Blumenstein, Schornsheim; Hans-Dieter Schwaben, Freisbach; Erich Klement, Rimbach, all of Germany

[73] Assignee: BASF Aktiengesellschaft, Ludwigshafen, Germany

[21] Appl. No.: 439,900

[22] Filed: May 12, 1995

[30] Foreign Application Priority Data

May 13, 1994 [DE] Germany ............... 44 16 862.4

[51] Int. Cl.⁶ .................... C08J 9/16; C08J 9/20
[52] U.S. Cl. ............... 521/59; 521/56; 521/60; 521/149; 521/150
[58] Field of Search ............... 521/59, 56, 60, 521/149, 150

[56] References Cited

U.S. PATENT DOCUMENTS

| | | |
|---|---|---|
| 3,281,383 | 10/1966 | Zelinski et al. |
| 4,307,134 | 12/1981 | Milkovich et al. |
| 4,333,970 | 6/1982 | Blommers et al. |
| 4,409,338 | 10/1983 | DiGiulio |
| 4,423,160 | 12/1983 | DiGiulio |
| 4,424,285 | 1/1984 | DiGiulio |
| 5,272,182 | 12/1993 | Burnell ............... 521/85 |

FOREIGN PATENT DOCUMENTS

| | | |
|---|---|---|
| 106129 | 4/1984 | European Pat. Off. |
| 561216 | 3/1993 | European Pat. Off. |
| 1220611 | 1/1971 | United Kingdom |

OTHER PUBLICATIONS

H. G. Elias, Markomoleküle, Hüthig--Verlag, Heidelberg 1971, S. 52-64.
Echte, Rubber--Toughened Stryene Plymers, Advances in Chemistry Series No. 222, 1989.

*Primary Examiner*—Morton Foelak
*Attorney, Agent, or Firm*—Keil & Weinkauf

[57] ABSTRACT

The invention relates to expandable styrene polymers for elastic polystyrene foams, comprising a) from 50 to 90% by weight of polystyrene and/or a styrene copolymer containing at least 50% by weight of copolymerized styrene, b) from 5 to 30% by weight of at least one styrene-soluble elastomer, c) from 5 to 20% by weight of at least one block copolymer containing styrene as one component, d) from 1 to 15% by weight, based on the sum of a), b) and c), of a low-boiling blowing agent, and, if desired, e) conventional additives in effective amounts, where, in the unfoamed polystyrene beads, component b) is in the form of cell particles and component c) is in the form of particles having a mean size of from 0.2 to 2 μm in the polystyrene phase, and to foams and foam moldings produced therefrom.

9 Claims, No Drawings

EXPANDABLE STYRENE POLYMERS

The present invention relates to expandable styrene polymers which are suitable for the production of elastic foams.

Foams based on expandable polystyrene particles have achieved considerable industrial importance as thermal insulation and packaging materials. They are produced on an industrial scale by first preparing expandable styrene polymers by suspension polymerization of styrene in the presence of a blowing agent, expanding these polymers by heating to give foam particles, and subsequently welding the particles in molds to give moldings.

Polystyrene foams are rigid. Their low elasticity is disadvantageous for many applications, for example in the packaging sector, since protection of the packaged goods against impact is only possible to an inadequate extent, and the foam moldings used as packaging materials break even on only small deformation.

Attempts have therefore already been made in the past to increase the elasticity of polystyrene foams.

EP-A-561 216 describes a process for elastifying polystyrene foams, in which foam-slabs having a density from 8 to 12 kg/m³ are compressed to about ⅓ of their size in one direction and then released again. Boards cut from the slabs treated in this way have increased elasticity and are used, for example, for solid-borne sound insulation.

However, the technicalities of the process mean that this procedure is very difficult to apply to moldings and is therefore not carried out.

U.S. Pat. No. 4,424,285 and U.S. Pat. No. 4,409,338 describe foamable styrene polymers which are prepared by polymerization of a solution of from 0.5 to 4.0% by weight of styrene-butadiene or styrene-butadiene-styrene block copolymers in styrene and which have a short mold cooling time.

However, this only increases the elasticity of the foams to an insignificant extent due to the small amount of rubber added.

In U.S. Pat. No. 4,307,134 and U.S. Pat. No. 4,333,970, shells of styrene-butadiene copolymers are polymerized onto polystyrene beads with partial grafting, and the resultant beads are impregnated with blowing agent and subsequently expanded. However, the resultant foams have an irregular cell structure and unsatisfactory mechanical properties.

GB-A-1,220,611 describes a foamable polymer composition having increased oil resistance which comprises a styrene-acrylonitrile copolymer and a polybutadiene elastomer, where the styrene-acrylonitrile copolymer is dispersed in the elastomer and the blowing agent is absorbed in the elastomer phase with swelling and partial dissolution. However, such foams have unsatisfactory mechanical properties.

U.S. Pat. No. 4,423,160 describes non-clumping, expandable styrene polymers having a short cooling time which are prepared by dissolving from 0.5 to 4.0% by weight of a block copolymer comprising from 2 to 50% by weight of styrene and from 50 to 98% by weight of a conjugated diene in styrene, polymerizing the solution in suspension and foaming the particles impregnated with blowing agent.

The advantage of these styrene polymers is the shortened cooling time, and the elastification remains low.

In all the prior-art processes described, the blowing agent diffuses out of the beads very rapidly. After only a few days, the loss of blowing agent can be so large that foaming of the beads no longer gives usable foams.

It is an object of the present invention to provide expandable styrene polymers which are suitable for the production of elastic foams, only lose small amounts of blowing agent, or none at all, even after extended storage, and are recyclable.

We have found that this object is achieved by expandable styrene polymers for elastic polystyrene foams, comprising a) from 50 to 90% by weight of polystyrene and/or a styrene copolymer containing at least 50% by weight of copolymerized styrene, b) from 5 to 30% by weight of a styrene-soluble elastomer, c) from 5 to 20% by weight of at least one block copolymer containing styrene as one component, d) from 1 to 15% by weight, based on the sum of a), b) and c), of a low-boiling blowing agent, and, if desired, e) conventional additives in effective amounts, where, in the unfoamed polystyrene beads, component b) is in the form of cell particles and component c) is in the form of particles having a mean size of from 0.2 to 2 μm in the polystyrene phase.

The present invention accordingly provides expandable styrene polymers for elastic polystyrene foams, comprising a) from 50 to 90% by weight of polystyrene and/or a styrene copolymer containing at least 50% by weight of copolymerized styrene, b) from 5 to 30% by weight of at least one styrene-soluble elastomer, c) from 5 to 20% by weight of at least one block copolymer containing styrene as one component, d) from 1 to 15% by weight, based on the sum of a), b) and c), of a low-boiling blowing agent, and, if desired, e) conventional additives in effective amounts, where, in the unfoamed polystyrene beads, component b) is in the form of cell particles and component c) is in the form of particles having a mean size of from 0.2 to 2 μm in the polystyrene phase.

The present invention furthermore provides elastic foams having a density of from 5 to 70 g/l, comprising a) from 50 to 90% by weight of polystyrene and/or a styrene copolymer containing at least 50% by weight of copolymerized styrene, b) from 5 to 30% by weight of at least one styrene-soluble elastomer, c) from 5 to 20% by weight of at least one block copolymer containing styrene as one component, and, if desired, d) conventional additives in effective amounts, the preparation of the styrene polymers and moldings produced from the elastic foams.

Component a) in the expandable styrene polymers comprises from 75 to 98% by weight, preferably from 85 to 93% by weight, of polystyrene and/or a styrene copolymer containing at least 50% by weight, preferably at least 80% by weight, of copolymerized polystyrene. Examples of suitable comonomers are α-methylstyrene, ring-halogenated styrenes, ring-alkylated styrenes, acrylonitrile, esters of acrylic or methacrylic acid with alcohols having 1 to 8 carbon atoms, N-vinylcarbazole, maleic acid and maleic anhydride. The polystyrene advantageously contains a small amount of a copolymerized crosslinking agent, ie. a compound containing more than one, preferably 2, double bonds, such as divinylbenzene, butadiene or butanediol diacrylate. The crosslinking agent is generally used in amounts of from 0.005 to 0.05 mol %, based on styrene.

In order to achieve particularly high expandability, it is expedient for the styrene polymer to have a mean molecular weight $M_w$ (weight average), measured by the GPC method, of from 100,000 to 200,000, in particular from 130,000 to 180,000. The foam has improved processing properties if the high-molecular-weight flank of the molecular-weight distribution curve measured by the GPC method is so steep that the difference between the means $(M_{z+1}-M_z)$ is less than 150,000. The GPC method is described in G. Glöckler, Polymercharakterisierung, Chromatographische Methoden, Volume 17, Hüthig-Verlag, Heidelberg, 1982. These means are described in H. G. Elias, Makromoleküle, Hüthig-Verlag, Heidelberg, 1971, pages 52–64.

Styrene polymers which have the abovementioned mean molecular weights can be obtained by carrying out the polymerization in the presence of regulators. The regulators used are expediently from 0.01 to 1.5% by weight, preferably from 0.01 to 0.5% by weight, of a bromine-free organic compound having a chain-transfer constant K of from 0.1 to 50. Addition of the regulator during the polymerization is expediently delayed until a conversion of from 20 to 90% has been reached in order to achieve a steep high-molecular-weight flank of the molecular-weight distribution curve.

An advantageous high expansion capacity can also be achieved if component a) contains from 0.1 to 10% by weight, advantageously from 0.5 to 10% by weight, of a styrene polymer having a mean molecular weight (weight average) of from 500 to 5000.

Further details on molecular-weight regulation in the preparation of expandable styrene polymers are given in EP-B 106 129.

Styrene polymers which contain from 0.1 to 2% by weight, preferably from 0.15 to 1.5% by weight, of copolymerized acrylonitrile give foams which are distinguished by substantial absence of shrinkage. A mixture of from 95 to 99.5% by weight of polystyrene and from 0.5 to 5% by weight of a styrene-soluble styrene-acrylonitrile copolymer also exhibits these properties if the total acrylonitrile content in the mixture is from 0.1 to 2% by weight, preferably from 0.15 to 2% by weight.

Styrene polymers containing from 3 to 20% by weight, preferably from 5 to 15% by weight, of copolymerized acrylonitrile give foams having high oil resistance. A mixture of from 50 to 85% by weight of polystyrene and from 15 to 50% by weight of a styrene-soluble styrene-acrylonitrile copolymer also exhibits this advantageous property if the total acrylonitrile content in the mixture is from 3 to 20% by weight, preferably from 5 to 15% by weight. Such mixtures are prepared in a simple manner by dissolving the proposed amount of styrene-acrylonitrile copolymer in styrene before the polymerization.

Styrene polymers containing from 2 to 15% by weight, in particular from 3 to 12% by weight, of maleic acid or maleic anhydride as comonomer give foams which are distinguished by high heat distortion resistance. It is advantageous to use a mixture of polystyrene and a commercially available styrene-maleic anhydride copolymer having a maleic anhydride content of from 15 to 49% by weight, which can easily be prepared by dissolving the copolymer in styrene before the polymerization.

Component b) is, in particular, a styrene-soluble elastomer having a glass transition temperature of below 20° C., preferably below −10° C., in particular below −20° C.

The elastomer is generally essentially uncrosslinked, if desired only crosslinked to the extent that the solubility in styrene is not impaired.

Preference is given for the novel styrene polymers to polybutadiene rubbers, in particular those having a molecular weight ($M_w$) of from 200,000 to 300,000 and containing < 50% of 1,4-cis structures and from 5 to 20% of 1,2-vinyl structures (medium-cis structure) or from 50 to 99% of 1,4-cis structures and < 5% of 1,2-vinyl structures (high-cis structure).

Component c) is a conventional block copolymer comprising styrene and at least one further olefinically unsaturated monomer, where the styrene content of the block copolymer is preferably at least 20% by weight, based on the total amount of monomers.

The further olefinically unsaturated monomers employed are in particular those containing one or two olefinic double bonds, in particular butadiene, isoprene or mixtures thereof.

The block copolymers have, in particular, a two-block and/or three-block structure. The transition between the blocks in the polymer chain can be sharp, but is also possible to incorporate a tapered transition between the blocks. In this structure, the polymer chain contains regions between the blocks in which the monomers are arranged randomly.

The polymer chains of the block copolymers can be linear, branched or dendritic.

It is furthermore possible to employ block copolymers in which some or all of the double bonds remaining after the polymerization have been hydrogenated.

Further details on the block copolymers used and their preparation are given, for example, in U.S. Pat. No. 3,281,383.

As component c), the expandable styrene polymers contain, in homogeneous distribution, from 2 to 15% by weight, preferably from 3 to 10% by weight, of a low-boiling blowing agent. The blowing agent should not dissolve the polystyrene, but should be soluble in polystyrene. The boiling point should be below the softening point of the polystyrene. Examples of suitable blowing agents are propane, butane, pentane, hexane, cyclopentane, cyclohexane, octane, dichlorodifluoromethane, trifluorochloromethane and 1,1-difluorochloroethane. Pentane is preferred.

The expandable styrene polymers may furthermore contain effective amounts of conventional additives, such as dyes, fillers, stabilizers, flameproofing agents, synergists, nucleating agents, lubricants, antistatics, substances which have a non-stick action during foaming, and agents for shortening the demolding time on expansion.

Other suitable additives are poly(2,6-dimethyl)-1,4-phenylene ether and poly-1,4-phenylene sulfide. In amounts of from 1 to 20% by weight, based on component a), these additives increase the heat distortion resistance of the foam.

The expandable styrene polymers are generally in the form of particles, ie. in bead form or granule form, and advantageously have a mean diameter of from 0.1 to 6 mm, in particular from 0.4 to 3 mm.

In the unfoamed beads of the novel expandable styrene polymers, component b) is in the form of cell particles and component c) is in the form of particles having a mean size of from 0.2 to 2 μm in the polystyrene phase. The cell particles should have diameters of from 0.1 to 10 μm, in particular from 0.5 to 5 μm.

Cell particles having relatively large diameters or other morphological structures of component b) in the expandable styrene polymers result in losses of blowing agent and in irregular structures of the foams produced.

Details on the morphology of elastomer-modified styrene polymers are given in Echte, Rubber-Toughened Styrene Polymers, Advances in Chemistry Series No. 222, 1989.

The novel styrene polymers are prepared for example by mixing components a), b), c) and, if used, d) in the melt, usually in an extruder, where, during addition of d), the extrudate must be cooled so rapidly after extrusion that foaming does not occur. The resultant styrene polymer is subsequently comminuted, usually by granulation.

It is furthermore possible to dissolve components b) and c) in styrene and to polymerize this solution.

In this process, components b) and c) are dissolved in styrene and this solution is polymerized by processes known per se, usually with addition of free-radical initiators or by the supply of heat.

It is also possible to carry out this polymerization in bulk to a conversion of about 30%, to suspend the resultant prepolymer in a known manner and to complete the polymerization in suspension. It is advantageous here to impregnate the polymer with the blowing agent in suspension during the polymerization. In this way, a bead-form polymer is obtained which can be converted into foams without further treatment.

Particularly favorable results are achieved if the styrene polymers are prepared by polymerization of a solution of component b) in styrene and mixing the polymer with component c), in particular in the melt.

The mixing of the polymer of a) and b) with component c) can be carried out, in particular, by extrusion.

The styrene polymer must subsequently be impregnated with the blowing agent d).

This can be achieved by adding the blowing agent to the molten polymer, for example during extrusion; here too, foaming must be prevented.

However, the blowing agent is advantageously added by the impregnation method.

To this end, the resultant polymers must be comminuted to particle sizes of, preferably, from 0.1 to 6 mm, in particular from 0.4 to 3 mm. This is expediently carried out by granulation after extrusion.

Depending on the granulation method, the particles are usually in bead form or pellet form.

For the impregnation, the granules are suspended in a liquid, usually water, in the presence of conventional auxiliaries and additives in a pressure container, and the latter is rendered inert and brought to a temperature which is above the softening point, but below the melting point, of the polymer. The blowing agent is injected at this temperature. After cooling and decompression, the impregnated granules are separated off, purified and dried, preferably at room temperature or slightly elevated temperature, of up to 50° C., for example in a stream of air.

This process is described, for example, in EP-A-343 473.

Further details on conventional preparation processes are given, for example, in Kunststoffhandbuch, Volume 5, Polystyrol, edited by R. Vieweg and G. Daumiller, Carl-Hanser-Verlag, Munich, 1969.

For the production of foams, the expandable styrene polymers are expanded in a known manner by heating to temperatures above their softening point, for example by means of hot air or preferably by means of steam. The foam particles obtained can be expanded further by re-heating after cooling and, if desired, after interim storage. They can subsequently be welded to form moldings in a known manner in molds which do not seal in a gas-tight manner.

The foams obtained have densities of from 5 to 70 g/l, in particular from 10 to 35 g/cm$^3$.

The foams produced from the novel styrene polymers are distinguished by high elasticity. Thus, they have a resilience of up to 90% on quadruple compression, measured in accordance with DIN 53 777. They are thus clearly superior to conventional styrene polymers.

The losses of blowing agent from the unfoamed beads are very low. Even after storage for several weeks, foaming was still possible without problems.

This is all the more surprising since the loss of blowing agent in styrene polymers of comparable composition in which the block copolymer was introduced into the polymer by dissolution in the styrene monomer and polymerization of this solution, known as interpolymerization, was so great even after a very short time that foaming was no longer possible.

The prefoamed beads have a uniform cell structure and weld during molding without formation of voids. The moldings produced in this way have excellent heat distortion resistance.

In addition, the novel foams have a surprisingly good thermal insulation capacity of up to 10% better than that of conventional polystyrenes of the same density. The foams and moldings can be recycled without problems.

The invention is illustrated in greater detail with reference to the examples below:

EXAMPLE 1

8 parts by weight of a polybutadiene having a molecular weight (Mw) of 250,000 and a content of 1,4-cis structures of 30.4% were dissolved in 92 parts by weight of styrene, and the solution was polymerized by means of free radicals by known methods.

The resultant polymer had a viscosity number of 70 cm$^3$/g, a softening point (Vicat) of 93° C. and a melt flow index of 3.7 cm$^3$/10 min at 200° C.

The polybutadiene phase was distributed in the polystyrene phase in the form of cell particles having diameters of from 0.5 to 2.5 µm.

100 parts by weight of this polymer were mixed with 18 parts by weight of a linear, anionically prepared styrene-butadiene-styrene block copolymer having a styrene content of 30% by weight, a molecular weight (Mw) of 92,000 and a melt flow index of < 1 cm$^3$/10 min at 200° C. and 5 kg (Cariflex® TR 1101 from Shell AG) at 180° C. in a Werner und Pfleiderer twin-screw extruder, and the mixture was forced through a die plate having 1 mm bores. The extrudates were solidified in a water bath and subsequently granulated to a particle size of 2×2×2 mm by means of a rotary blade.

In the resultant blend, the polybutadiene phase was in the form of cell particles having particle sizes of from 1 to 5 µm in diameter and the styrene-butadiene-styrene block copolymer phase was in the form of particles having a maze structure with diameters of from 0.1 to 1.5 µm.

6000 g of this blend were introduced into a 50 l stirred reactor together with 21,300 g of demineralized water, 76 g of sodium pyrophosphate, 155 g of magnesium sulfate heptahydrate and 50 g of a 40% strength by weight solution of an alkylbenzenesulfonate (Mersolat® K 30, Bayer AG). The reactor was closed, flushed twice with 1 atm of nitrogen and heated to 120° C. with stirring at 250 rpm. When this temperature had been reached, 600 g of a mixture of 80% by weight of n-pentane and 20% by weight of isopentane were injected into the reactor over a period of 15 minutes, and the mixture was stirred at 120° C. for a further 10 hours.

After cooling and decompression, the reactor contents were discharged. The beads were collected, washed twice with demineralized water and dried in a suction filter by sucking through ambient air at 23° C.

The beads had a blowing agent content of 4.7% by weight and a water content of 1.0% by weight.

After open storage for one day, single prefoaming for 7 minutes gave a bulk density of 23.8 g/l.

After open storage for three days, a bulk density of 24.7 g/l was achieved under the same prefoaming conditions.

In both cases, the foam had a homogeneous, medium-fine structure.

In a press into which steam could be introduced from the top and bottom, the prefoamed beads were converted into moldings having a density of 23 g/l.

After quadruple compression by 70%, the moldings had a recovery of 88% (determined in accordance with DIN 53 577). The Poensgen thermal conductivity (DIN 52 616) was 6% below the corresponding value, determined under the same conditions, for the standard polystyrene Styropor® F 14 (BASF AG) of the same density.

EXAMPLE 2

9 parts by weight of polybutadiene having a molecular weight (Mw) of 250,000 and a content of 1,4-cis structures of 90% and 91 parts by weight of styrene were converted as described in Example 1 into a polymer having a viscosity number of 80 cm³/g, a softening point (Vicat) of 95° C. and a melt flow index of 3.4 cm³/10 min at 200° C. and 10 kg. The polybutadiene phase was distributed in the polystyrene phase in the form of cell particles having diameters of from 0.5 to 2.5 μm.

85 parts by weight of this product were mixed with 15 parts by weight of an anionically prepared styrene-butadiene block copolymer having a styrene content of 20% by weight and a melt flow index of 16 cm³/10 min at 170° C. and 10 kg (Hybrar® VS-1 from Kuraray) under the extruder conditions mentioned in Example 1, and the mixture was converted into pellets measuring 1×1×3 mm.

7500 g of these pellets were impregnated under the conditions mentioned in Example 1 with 750 g of a mixture of 80% by weight of n-pentane and 20% by weight of isopentane and 150 g of n-heptane; in contrast to Example 1, the temperature was 150° C.

After work-up, the beads had a blowing agent content of 7.8% by weight and a water content of 1.1% by weight.

After open storage for one day, single prefoaming for 10 minutes gave a bulk density of 22.4 g/l. After open storage for three days, the bulk density was 25.1 g/l.

In both cases, the foam had a homogeneous, medium-fine structure.

The prefoamed beads were expanded a second time for 2 minutes to give a bulk density of 19.8 g/l and were converted, as described in Example 1, into moldings having a density of 21 g/l.

After quadruple compression by 50%, these had a recovery of 86% (DIN 53 577). The Poensgen thermal conductivity (DIN 52 616) was 6% below that of the standard polystyrene Styropor® F 14 (BASF AG) of the same density.

We claim:

1. An expandable styrene polymer for elastic polystyrene foams, comprising
    a) from 50 to 90% by weight of polystyrene and/or a styrene copolymer containing at least 50% by weight of copolymerized styrene,
    b) from 5 to 30% by weight of at least one styrene-soluble elastomer, comprising a polybutadiene rubber
    c) from 5 to 20% by weight of at least one block copolymer containing styrene and a polymerizable ethylenically unsaturated monomer as one component,
    d) from 1 to 15% by weight, based on the sum of a), b) and c), of a low-boiling blowing agent, and, if desired,
    e) conventional additives in effective amounts,
where, in the unfoamed polystyrene beads, component b) is in the form of cell particles and component c) is in the form of particles having a mean size of from 0.2 to 2 μm in the polystyrene phase.

2. An expandable styrene polymer as claimed in claim 1, wherein component b) is a styrene-soluble elastomer having a glass transition temperature of below 20° C.

3. An expandable styrene polymer as claimed in claim 1, wherein component b) is polybutadiene.

4. An expandable styrene polymer as claimed in claim 1, wherein component c) is a styrene-butadiene block copolymer.

5. An expandable styrene polymer as claimed in claim 1, wherein component c) has a styrene content of at least 20% by weight, based on c).

6. An expandable styrene polymer as claimed in claim 1, wherein component c) is a styrene-butadiene two-block copolymer.

7. An expandable styrene polymer as claimed in claim 1, wherein component c) is a styrene-butadiene-styrene three-block copolymer.

8. An expandable styrene polymer as claimed in claim 1, wherein component c) is a mixture of a styrene-butadiene two-block copolymer and a styrene-butadiene-styrene three-block copolymer.

9. An elastic foam having a density of from 15 to 70 g/l, comprising
    a) from 50 to 90% by weight of polystyrene and/or a styrene copolymer containing at least 50% of copolymerized styrene,
    b) from 5 to 30% by weight of a styrene-soluble elastomer, comprising a polybutadiene rubber
    c) from 5 to 20% by weight of at least one block copolymer containing styrene and a polymerizable ethylenically unsaturated monomer as one component, and, if desired,
    d) conventional additives in effective amounts.

* * * * *